Figure 1:
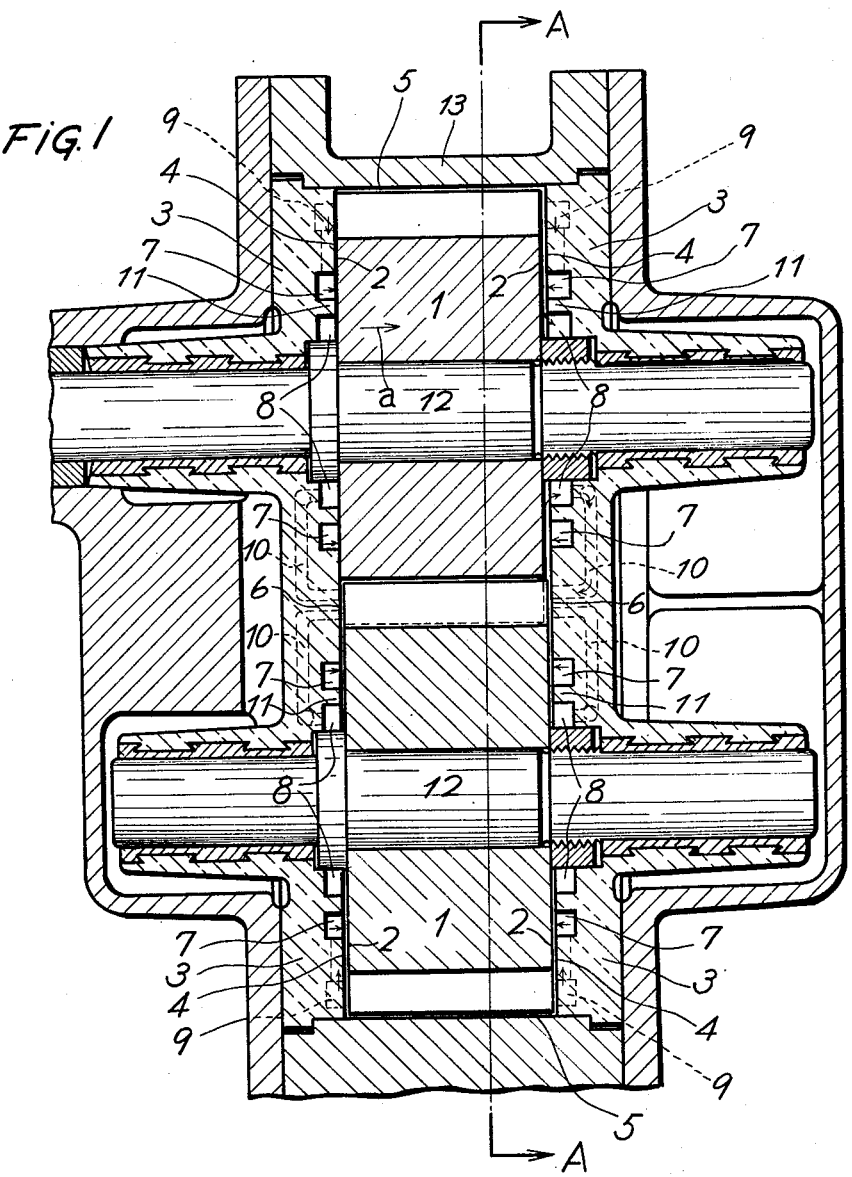

Feb. 18, 1958   SHIGEO TOYODA   2,823,616
HORIZONTAL TYPE GEAR PUMP
Filed May 23, 1955   2 Sheets-Sheet 1

INVENTOR.
SHIGEO TOYODA
BY
Leon M. Strauss
AGT.

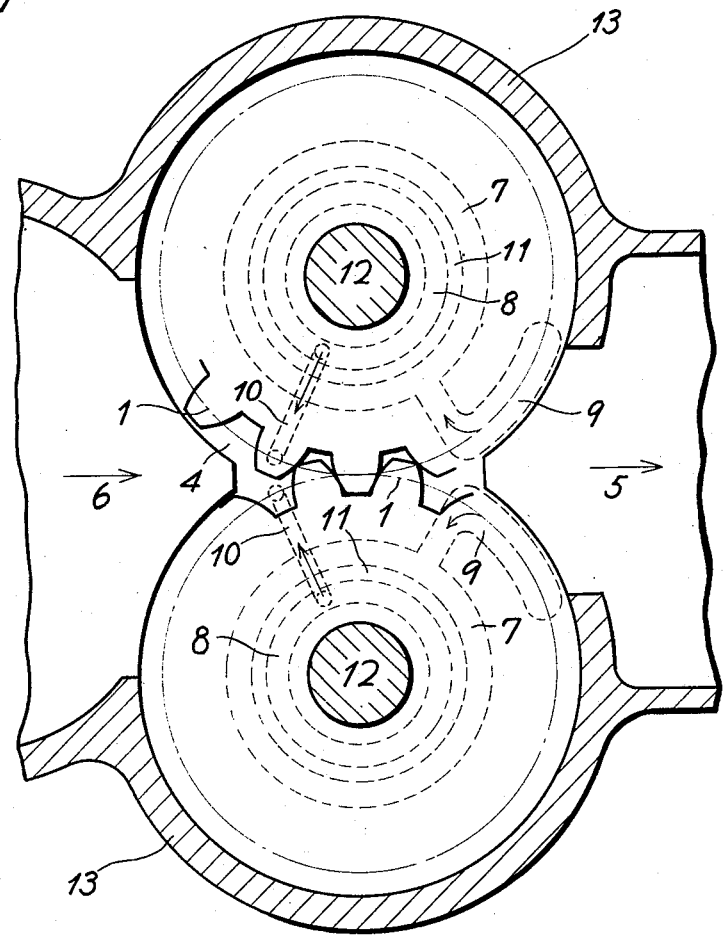

2,823,616

HORIZONTAL TYPE GEAR PUMP

Shigeo Toyoda, Zushi, Kanagawa-ken, Japan

Application May 23, 1955, Serial No. 510,412
In Japan September 2, 1948

Public Law 619, August 23, 1954
Patent expires September 2, 1968

3 Claims. (Cl. 103—126)

This invention is substantially concerned with improvements in or relating to horizontal type gear pumps.

Gear pumps of the kind referred to and hitherto common known suffer from the disadvantage that the pump gears or impellers are, in operation, liable to be eventually displaced from the balanced central position in the axial direction. Such difficulty, when encountered, will disturb the smooth running and finally cause over-heating of the bearings, causing to a greater or lesser degree damage to the pump. Further, the inner side-surfaces of the bearings adjacent to the sides of the toothed wheels had to be accurately finished to avoid said over-heating as far as possible.

It is, therefore, an object of the present invention to provide a gear pump of the kind referred to, especially adapted for use as a high capacity oil pump, which operates more smoothly and with higher efficiency.

Another object of this invention is to provide a gear pump of the above kind, which will never cause over-heating of the bearings resulting from relative axial displacement of the impellers.

Still another object of the invention is to provide a gear pump of said kind, which may dispense with accurate finishing on the inner side-surfaces of the bearings adjacent to the sides of the impellers.

According to the present invention in a horizontal type gear pump there are provided pairs of elongated recesses leading to the delivery and suction sides of the pump, respectively, on each of the inner side-surfaces of the bearings for each operating toothed wheel or impeller. Each pair of said elongated recesses is preferably formed in the manner of circular concentric grooves separated from each other by a separating wall arranged therebetween, and both concentric grooves are arranged always in communication with the delivery and suction sides of the pump, respectively, through curved passage or connecting grooves, which preferably extend radially of the gears at first and circumferentially of said gears thereafter.

By these constructions, the impellers are normally subjected to axial pressures directed oppositely of one another and having equal magnitudes under the normal operating conditions under the influence of pressure liquid prevailing in the elongated recesses leading to the delivery side of the pump, thus providing a floating action to each of the impellers.

When one or both of the impellers are eventually displaced axially from the balanced central position, the liquid pressure acting in the same direction as the displacement is decreased to substantially nil, so that the displaced impeller or impellers are returned to the original central position between the bearings under the action of the opposing liquid pressure which is retained as before in spite of said axial displacement, or specifically to say by the pressure difference between the liquid pressures at both sides of the impeller concerned. This pressure difference is established by the increased clearance between the displaced impeller and the associated bearing situated at the remote side of said impeller as seen in the direction opposite to the direction of said axial movement, because of the by-pass connection thus established between said elongated recesses or circular concentric grooves at the side concerned.

It will be realized that under the invention, the gear pump operates almost always in balanced conditions by the action of said floating arrangement under influence of the axial displacement compensating means of the differential pressure type, and thus smoother running free of any over-heating of bearings and gear casing may be easily attained.

According to another feature of the invention, the aforesaid floating and compensating principle is extended to a vertical type gear pump by such further arrangement that the total weight of the impellers together with the shafts is counter-acted or balanced out by the influence of the discharge pressure of the pump.

The accompanying more or less diagrammatic drawings have been chosen to illustrate one only of the numerous embodiments of the invention, the form shown having been selected from the standpoints of convenience in illustration, satisfactory operation and clear demonstration of the principle involved. In these drawings:

Figure 1 shows a longitudinal section through the pump in a plane containing the shaft axes of a horizontal type gear pump as an example of the present invention, and Figure 2 represents a sectional side view taken on the line A—A in Figure 1.

Referring now more particularly to Figures 1 and 2 of the drawings, a horizontal type gear pump according to this invention comprises a pair of cooperating toothed wheels 1 with shafts 12 rotatably supported through plain bearings 3 by the pump casing assembly 13, each inner side-surface 4 of each bearing 3 being provided at the portion adjacent to the corresponding side 2 of the respective wheel 1 with elongated recesses 7 and 8, which are separated from each other and so arranged always to communicate with the discharge and suction sides 5 and 6 of the pump, respectively. In the particular pump shown, each of said recesses 7 is formed as a circular groove, from which extends a connecting groove 9 radially and outwardly of the respective gear or wheel 1 at first and circumferentially thereof for a certain distance thereafter. The latter groove 9 is also so arranged that it connects said circular groove 7 always with the delivery side 5 of the pump each of recesses 8 is similarly formed as a circular groove, which is separated through a circular wall 11 from said groove 7 and provided again with a connecting groove 10. Said groove 10 is so arranged that it connects said circular groove 8 always with the suction side 6 of the pump.

The operation of the above-explained gear pump is as follows:

When, in operation, the cooperating toothed wheels 1 rotate under normal working conditions, or more specifically to say at the correct relations of gears 1 relative to bearings 3 at both sides thereof and also without any unfavorable axial displacement of said gears, the latter will continue to operate under the perfectly balanced conditions, because of the fact that the pressure liquid arrives from the delivery side 5 of the pump through connecting grooves 9 to circular grooves 7 and thus presses the gears at their both sides 2 in just opposed direction and with equal forces or pressures. These conditions are clearly shown in the lower half of Figure 1.

On the contrary, however, when any of the gears 1 is eventually displaced in the axial direction to some degree, for instance to the left side as somewhat exaggeratedly shown in the upper half of Figure 1, the clearance between the right side-surface 2 of said gear and the inner surface 4 of the corresponding right hand bearing 3 is correspondingly increased, and the pressure liquid prevailing in the related right hand circular groove 7 will escape across and about the separating wall 11 to the neighboring circular groove 8 and thence through passage 10 to suction side 6 of the pump. Thus, the pressure prevailing in said groove 7 is appreciably lowered, so that the gear 1 concerned is pressed to the right as shown by the arrow *a* in the drawing by the pressure liquid prevailing in the left and upper side circular groove 7 and having substantially the same pressure as in the delivery side 5 of the pump, and vice versa. Thus, the pump gears 1 can operate almost always in the normal balanced conditions.

Having described the invention, what is claimed as new and desired to be secured by Letters Patent is:

1. A gear pump, comprising a casing having a suction opening and a delivery opening, a pair of parallel shafts rotatably journaled in said casing, a pair of gears mounted on said shafts, respectively, and meshing with one another to transport pressure fluid from said suction opening of said casing to said delivery opening thereof, said gears having opposite side faces, respective bearings supporting said shafts and provided with oppositely facing inner bearing surfaces located adjacent said side faces of said gears, respectively, each inner bearing surface being provided with two pairs of first and second concentric annular recesses separated by an annular partition, each pair of said recesses being located coaxially with respect to the corresponding shaft and gear, said first recess of each pair of said concentric recesses communicating with said suction opening and said second recess of each pair of concentric recesses communicating with said delivery opening of said casing, whereby said gears are maintained in an axially balanced and centered position relative to one another due to the effects of the pressure exerted on said opposite side faces of said gears by said fluid entering said second recesses from said delivery opening, displacement of one or the other of said gears axially of itself increasing the clearance between one of its side faces and the adjacent inner bearing surface and permitting enhanced flow of said pressure fluid about and across the corresponding partition from the respective second recess to the associated first recess concentric therewith and communicating with the suction opening of the pump casing, thereby permitting the unbalanced pressure of said fluid in the oppositely located second recess acting on the other side face of said gear to return the same to its balanced position.

2. In a gear pump having a pump casing assembly provided with inlet and outlet openings for liquid to be delivered, and a pair of liquid-feeding toothed wheels mounted on respective shafts journaled in said casing assembly, said wheels having opposite side faces; respective plain bearings rotatably supporting said shafts with said wheels and provided with inner bearing surfaces disposed adjacent said side faces of said wheels, respectively, each inner bearing surface being provided with two pairs of first and second concentric circular recesses and with an annular partition separating said recesses, each pair of recesses being located coaxially with respect to a corresponding one of said shafts and wheels, said bearings being further provided with first elongated passageways connecting said first recesses, respectively, to said inlet opening, and with second elongated passageways connecting said second recesses, respectively, to said outlet opening, said pairs of recesses adjacent said opposite side faces of each wheel serving as centering means for that wheel so as to eliminate deleterious effects of unbalanced axial thrust on that wheel.

3. In a gear pump according to claim 2; said second recesses being the outer ones of the respective pairs of concentric recesses.

References Cited in the file of this patent

UNITED STATES PATENTS

| 1,372,576 | Tullman | Mar. 22, 1921 |
| 1,379,587 | Fisher | May 24, 1921 |
| 1,620,261 | Kennedy | Mar. 8, 1927 |
| 1,795,579 | Storey | Mar. 10, 1931 |
| 2,111,883 | Burghauser | Mar. 22, 1938 |
| 2,221,412 | Rose | Nov. 12, 1940 |
| 2,281,767 | Heckert | May 5, 1942 |
| 2,336,294 | Rea | Dec. 7, 1943 |
| 2,471,149 | Girz | May 24, 1949 |
| 2,479,077 | McAlvay | Aug. 16, 1949 |
| 2,498,911 | Chittenden | Feb. 28, 1950 |
| 2,571,377 | Olah | Oct. 16, 1951 |
| 2,626,570 | Armington et al. | Jan. 27, 1953 |